United States Patent
Yano et al.

(10) Patent No.: US 11,413,598 B2
(45) Date of Patent: Aug. 16, 2022

(54) REACTOR

(71) Applicant: IHI CORPORATION, Tokyo (JP)

(72) Inventors: Akihisa Yano, Tokyo (JP); Shigeki Sakakura, Tokyo (JP); Shunji Miyajima, Tokyo (JP); Takahito Akita, Tokyo (JP); Taiga Yamamoto, Tokyo (JP); Yusuke Takeuchi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 57 days.

(21) Appl. No.: 17/095,801

(22) Filed: Nov. 12, 2020

(65) Prior Publication Data

US 2021/0060520 A1 Mar. 4, 2021

Related U.S. Application Data

(63) Continuation of application No. PCT/JP2019/019536, filed on May 16, 2019.

(30) Foreign Application Priority Data

May 17, 2018 (JP) .............................. JP2018-095175

(51) Int. Cl.
*B01J 19/24* (2006.01)
*C10G 2/00* (2006.01)

(52) U.S. Cl.
CPC ............ *B01J 19/249* (2013.01); *C10G 2/341* (2013.01)

(58) Field of Classification Search
CPC ............ B01J 19/249; B01J 2219/00094; B01J 2219/2453; B01J 2219/2462;
(Continued)

(56) References Cited

U.S. PATENT DOCUMENTS 10,118,148 B2 * 11/2018 Sakakura ................ C07C 1/041
2010/0324158 A1 12/2010 Bowe et al.
(Continued)

FOREIGN PATENT DOCUMENTS

JP 2011-508043 A 3/2011
JP 2013-508150 A 3/2013
(Continued)

OTHER PUBLICATIONS

European Patent Office, "Extended European Search Report," issued in European Patent Application No. 19 803 297.1, which is a counterpart to U.S. Appl. No. 17/095,801, dated Jan. 4, 2022, 9 pages.

*Primary Examiner* — Huy Tram Nguyen

(57) ABSTRACT

In a reactor, a first reference position is presumed to be defined by a straight line in contact with a first open end of the introduction port on the side bent toward the second flow channel and extending in the direction intersecting with the second flow channels, and a second reference position is presumed to be defined by a straight line in contact with a second open end of the introduction port on the opposite side of the first open end and extending in the direction intersecting with the second flow channel. At least part of the catalyst body is provided at least either in a region defined between the first reference position and the second reference position, or in a region defined between the second reference position and an inlet position of the first flow channels.

3 Claims, 12 Drawing Sheets

(58) Field of Classification Search
CPC ........ B01J 2219/2479; B01J 2219/2482; B01J 2219/2498; B01J 2219/3221; B01J 2219/32466; B01J 12/007; B01J 15/005; B01J 19/248; C10G 2/341; C10G 2/34; F28D 2021/0022; F28F 7/02
USPC ........................................................ 422/198
See application file for complete search history.

(56) References Cited

U.S. PATENT DOCUMENTS

| | | |
|---|---|---|
| 2012/0210995 A1 | 8/2012 | West |
| 2013/0202498 A1 | 8/2013 | Maxted et al. |
| 2017/0072379 A1 | 3/2017 | Hamada |
| 2018/0093241 A1 | 4/2018 | Sakakura et al. |
| 2018/0318786 A1 | 11/2018 | Yano et al. |
| 2018/0372415 A1 | 12/2018 | Yoshinoya et al. |
| 2019/0219344 A1 | 7/2019 | Yamamoto et al. |

FOREIGN PATENT DOCUMENTS

| | | |
|---|---|---|
| JP | 2013-540052 A | 10/2013 |
| JP | 2016-049491 A | 4/2016 |
| JP | 2017-140591 A | 8/2017 |
| TW | 201125635 A1 | 8/2011 |
| WO | 2016/199790 A1 | 12/2016 |
| WO | 2017/051624 A1 | 3/2017 |
| WO | 2017/150653 A1 | 9/2017 |
| WO | 2018/070427 A1 | 4/2018 |

\* cited by examiner

FIG. 4
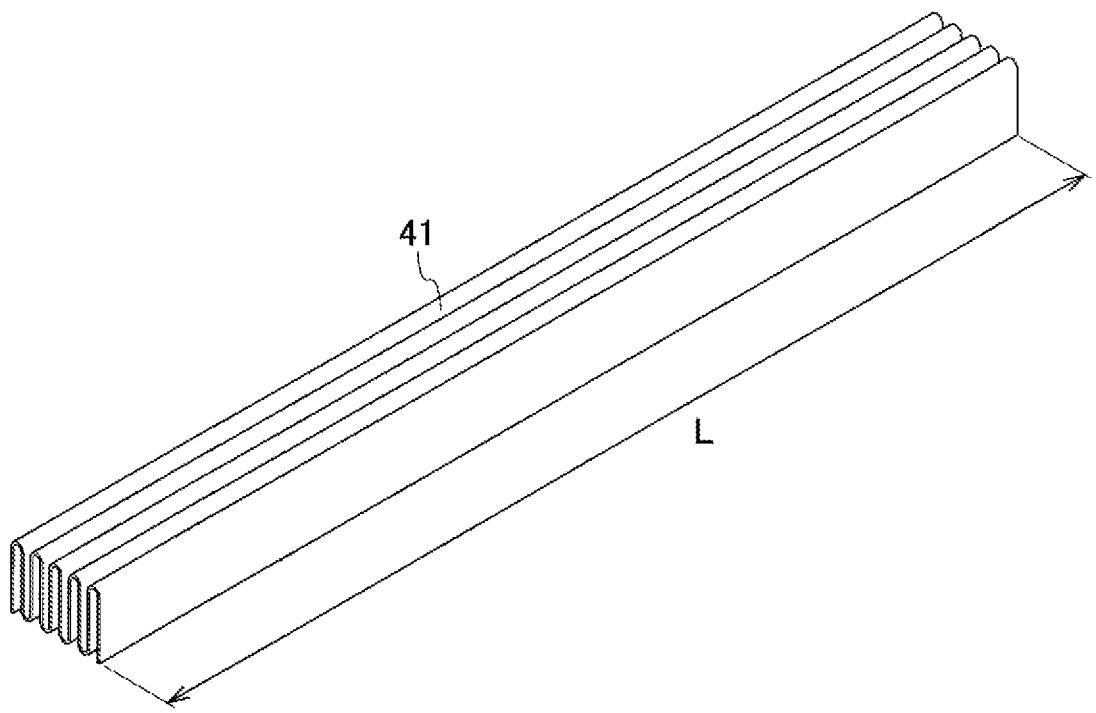

REACTOR

CROSS REFERENCE TO RELATED APPLICATIONS

This application is a continuation application of International Application No. PCT/JP2019/019536, filed on May 16, 2019, which claims priority to Japanese Patent Application No. 2018-095175, filed on May 17, 2018, the entire contents of which are incorporated by reference herein.

BACKGROUND

1. Technical Field

The present disclosure relates to a heat exchanger-type reactor.

2. Description of the Related Art

Heat exchanger-type reactors are known that heat or cool a reaction fluid in a gas or liquid state containing reaction raw material as a reactant by use of a heat medium so as to promote a reaction of the reactant. International Publication WO 2016/199790 (Patent Literature 1) discloses a reactor including first structures having reaction flow channels through which a reaction fluid flows and second structures having heat medium flow channels through which a heat medium flows, the first structures and the second structures being alternately stacked on one another. The reactor uses, as reaction regions, at least part of regions in which the reaction flow channels are parallel to the heat medium flow channels.

SUMMARY

In the reactor disclosed in WO 2016/199790, the reaction fluid introduced into the respective reaction regions is preferably preliminarily heated to about a reaction temperature in order to obtain a product having higher purity. To deal with this, the reactor needs to be provided with a preheating device for preliminarily heating the reaction fluid to a required temperature in a piping system continuously connected on the upstream side of the respective reaction regions, for example. The parallel use of the preheating device leads to an increase in cost of the entire system including the reactor.

An object of the present disclosure is to provide a reactor capable of preliminarily heating a reaction fluid without using a preheating device.

A reactor according to an aspect of the present disclosure includes a first flow channel through which a reaction fluid flows, a second flow channel through which a heat medium flows, the second flow channel being stacked parallel to the first flow channel, an introduction port open in a direction intersecting with the second flow channel to introduce the heat medium, and a catalyst body provided in the first flow channel to promote an exothermic reaction of the reaction fluid, wherein, when a first reference position is presumed to be defined by a straight line in contact with a first open end of the introduction port on a side bent toward the second flow channel and extending in the direction intersecting with the second flow channel, and a second reference position is presumed to be defined by a straight line in contact with a second open end of the introduction port on an opposite side of the first open end and extending in the direction intersecting with the second flow channel, at least part of the catalyst body is provided at least either in a region defined between the first reference position and the second reference position, or in a region defined between the second reference position and an inlet position of the first flow channel.

BRIEF DESCRIPTION OF THE DRAWINGS

FIG. 4 is a perspective view showing a catalyst body.

DESCRIPTION OF THE EMBODIMENTS

Figure 1:
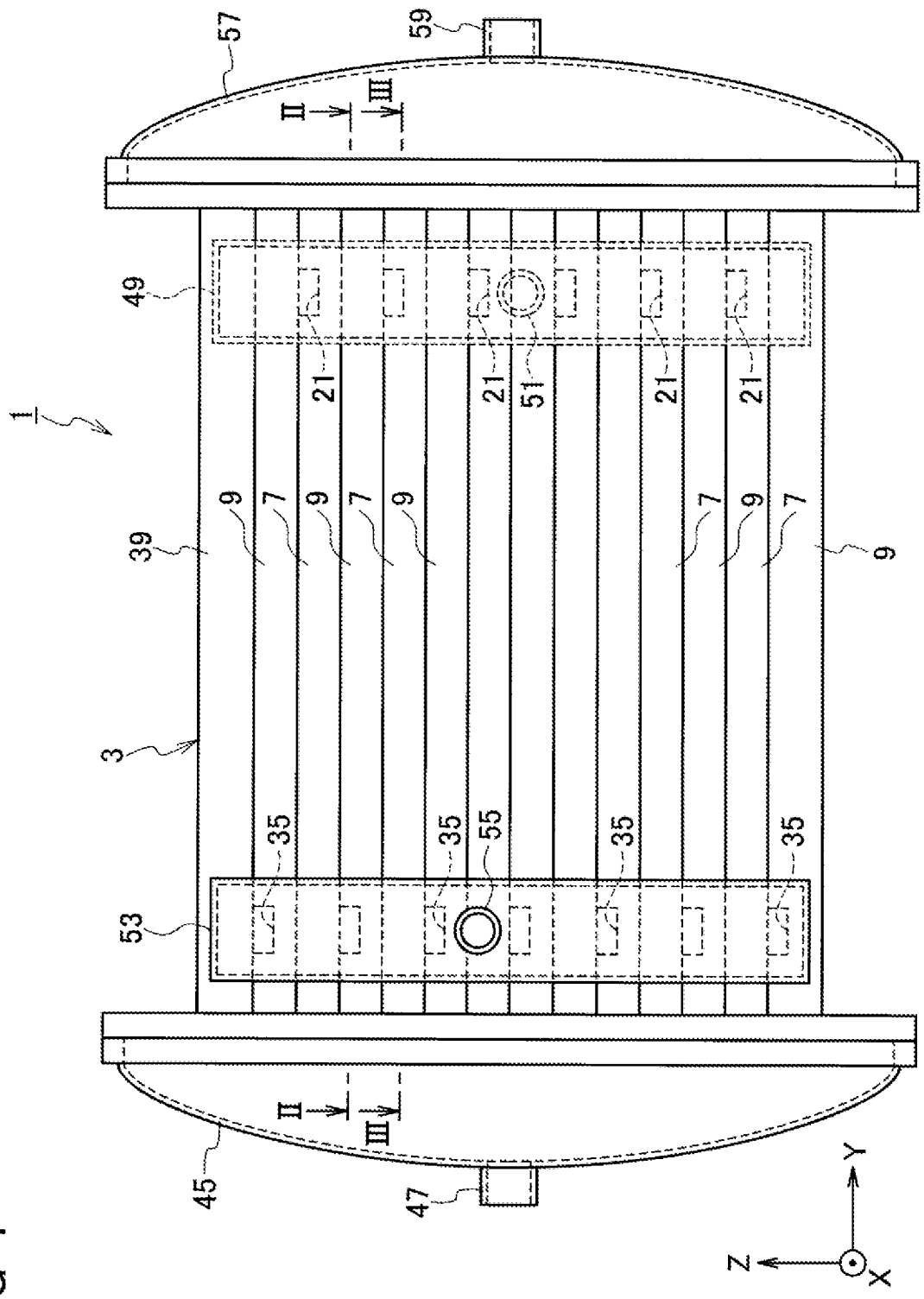
FIG. 1 is a side view showing a structure of a reactor according to a first embodiment of the present disclosure.

Embodiments according to the present disclosure will be described in detail below with reference to the drawings. The following dimensions, materials, and specific numerical values described in the respective embodiments are indicated for illustration purposes, and the present disclosure is not intended to be limited thereto unless otherwise specified. The elements having substantially the same functions and structures illustrated below are designated by the same reference numerals, and overlapping explanations are not made below. The elements described below but not related directly to the present disclosure are not shown in the drawings. In the following explanations of the drawings, a vertical direction is defined as a Z-axis, an extending direction of reaction regions in first reaction flow channels described below on a plane perpendicular to the Z-axis is defined as a Y-axis, and a direction perpendicular to the Y-axis is defined as an X-axis.

Reactors according to the following embodiments each utilize heat exchange between a reaction fluid and a heat medium, and promote an exothermic reaction of the reaction fluid so as to produce a product. The reaction fluid as used herein is a fluid in a gas or liquid state containing reaction raw material as a reactant. In the respective embodiments, the reaction fluid mainly refers to raw material gas M, but also includes product gas P containing a product and discharged from a heat exchange unit 3 after the reaction treatment. The heat medium is high-temperature gas HC.

First Embodiment

A reactor according to a first embodiment of the present disclosure is described below. FIG. 1 is a side view showing a structure of the reactor 1 according to the present embodiment. The reactor 1 includes a heat exchange unit 3, a reaction fluid introduction part 45 and a product drain part 49, and a heat medium introduction part 53 and a heat medium drain part 57.

The heat exchange unit 3 executes the reaction treatment for producing a product from the raw material gas M. The heat exchange unit 3 includes a plurality of first heat transfer bodies 7 including reaction flow channels through which a reaction fluid flows, a plurality of second heat transfer bodies 9 including heat medium flow channels through which a heat medium flows, and a lid body 39. The heat exchange unit 3 has a parallel flow-type structure in which the reaction fluid and the heat medium flow in the same direction. The first heat transfer bodies 7, the second heat transfer bodies 9, and the lid body 39 are each a plate-like member made of a heat transfer material having thermal resistance.

Figure 2:
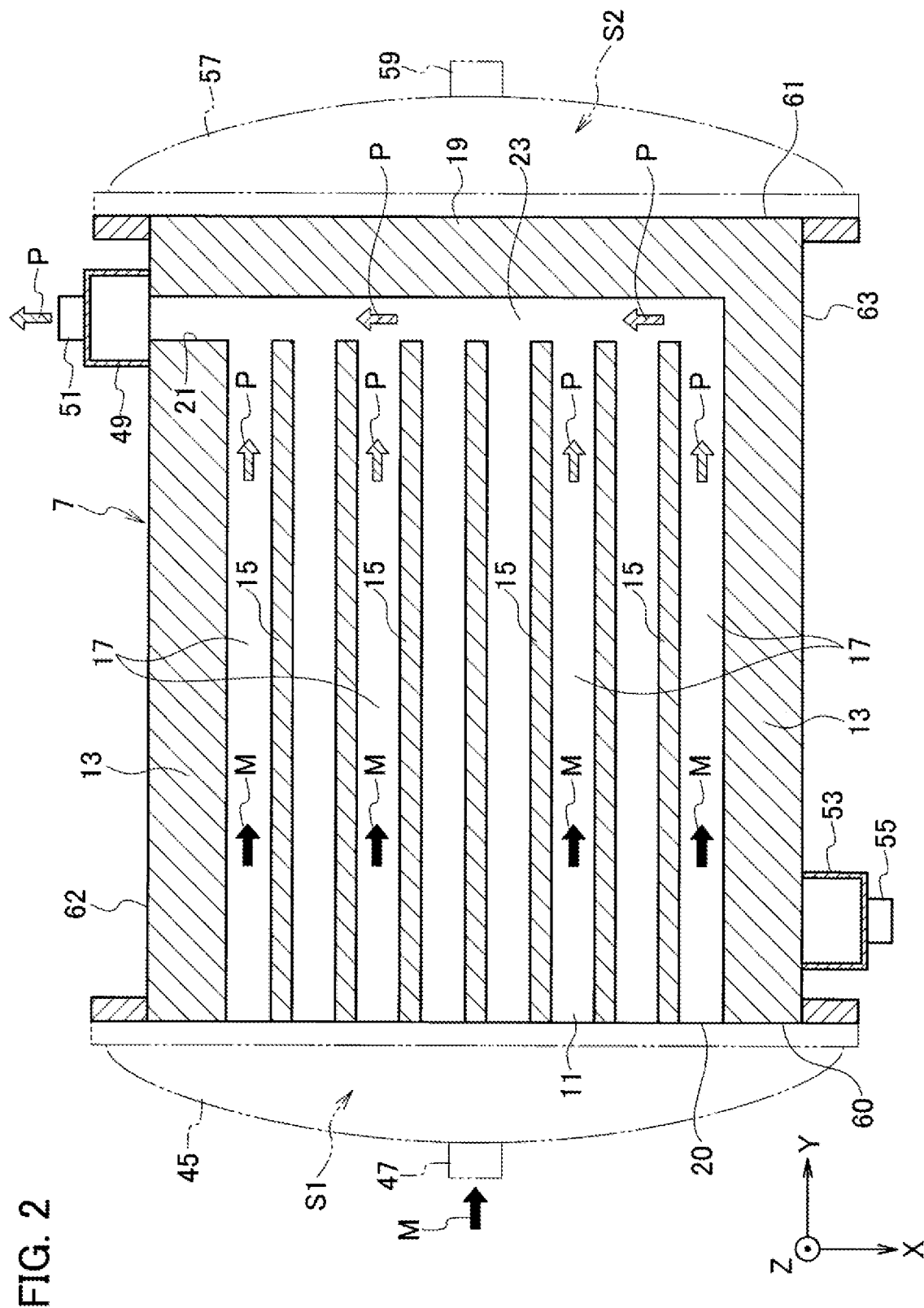
FIG. 2 is a cross-sectional view showing a structure of a first heat transfer body corresponding to a cross-sectional view taken along line II-II in FIG. 1.

FIG. 2 is a cross-sectional view taken along the first heat transfer body 7 in the horizontal direction showing a structure and a shape of a part including the first heat transfer body 7 of the reactor 1. The respective first heat transfer bodies 7 include a plurality of first flow channels 17 as the reaction flow channels including reaction regions. The reaction regions are located inside the respective first flow channels 17 to cause the high-temperature gas HC flowing through the second flow channels 31 of the respective second heat transfer bodies 9 to absorb heat to make the raw material gas M react so as to produce a product. The respective first flow channels 17 are a groove having a rectangular shape in cross section with the upper side open in the Z direction. According to the present embodiment, the respective first flow channels 17 extend straight in the Y direction, and are arranged at regular intervals in the X direction. One end of the respective first flow channels 17 is open at a first side surface 60 of the heat exchange unit 3 including one side surface of the respective first heat transfer bodies 7 so as to serve as a first introduction port 20 from which the raw material gas M is introduced. The first side surface 60 is the side surface facing a first space S1. The other end of the respective first flow channels 17 is located immediately in front of a second side surface 61 of the heat exchange unit 3 including the other side surface of the respective first heat transfer bodies 7, and communicates with a first communication flow channel 23 as described below. The second side surface 61 is the side surface facing a second space S2.

The first heat transfer bodies 7 each include a first base 11, two first side walls 13, a plurality of first interposition walls 15, and a first partition wall 19. The first base 11 is a plate portion covering the entire X-Y plane of the respective first heat transfer bodies 7. The first side walls 13 are wall portions provided at the respective ends on both right and left sides of the extending direction of the first flow channels 17 on one of the main surfaces of the first base 11. The respective first interposition walls 15 are wall portions interposed between the two first side walls 13 on one of the main surfaces of the first base 11 and arranged at regular intervals parallel to the first side walls 13. The first partition wall 19 extends in the X direction perpendicular to the extending direction of the first flow channels 17 toward the second side surface 61 on one of the main surfaces of the first base 11. The first flow channels 17, if extending to reach the second side surface 61, would be brought into contact with the second space S2 in which the high-temperature gas HC is introduced. To avoid this, the first partition wall 19 changes the flowing direction of the product gas P passing through the respective first flow channels 17.

The respective first heat transfer bodies 7 include the first communication flow channel 23 extending along the inner surface of the first partition wall 19. The present embodiment is illustrated with the case in which the single first communication flow channel 23 communicates with all of the first flow channels 17. One end of the first communication flow channel 23 communicates with a first drain port 21 provided at one of the first side walls 13 so as to discharge the product to the outside of the respective first heat transfer bodies 7. The first communication flow channel 23, which allows the raw material gas M and the product gas P to flow therethrough, can be a part of the respective first flow channels 17. While the product gas P discharged from the first drain port 21 contains the product produced in the respective first flow channels 17, the raw material gas M not used for the reaction may remain in the product gas P.

Figure 3:
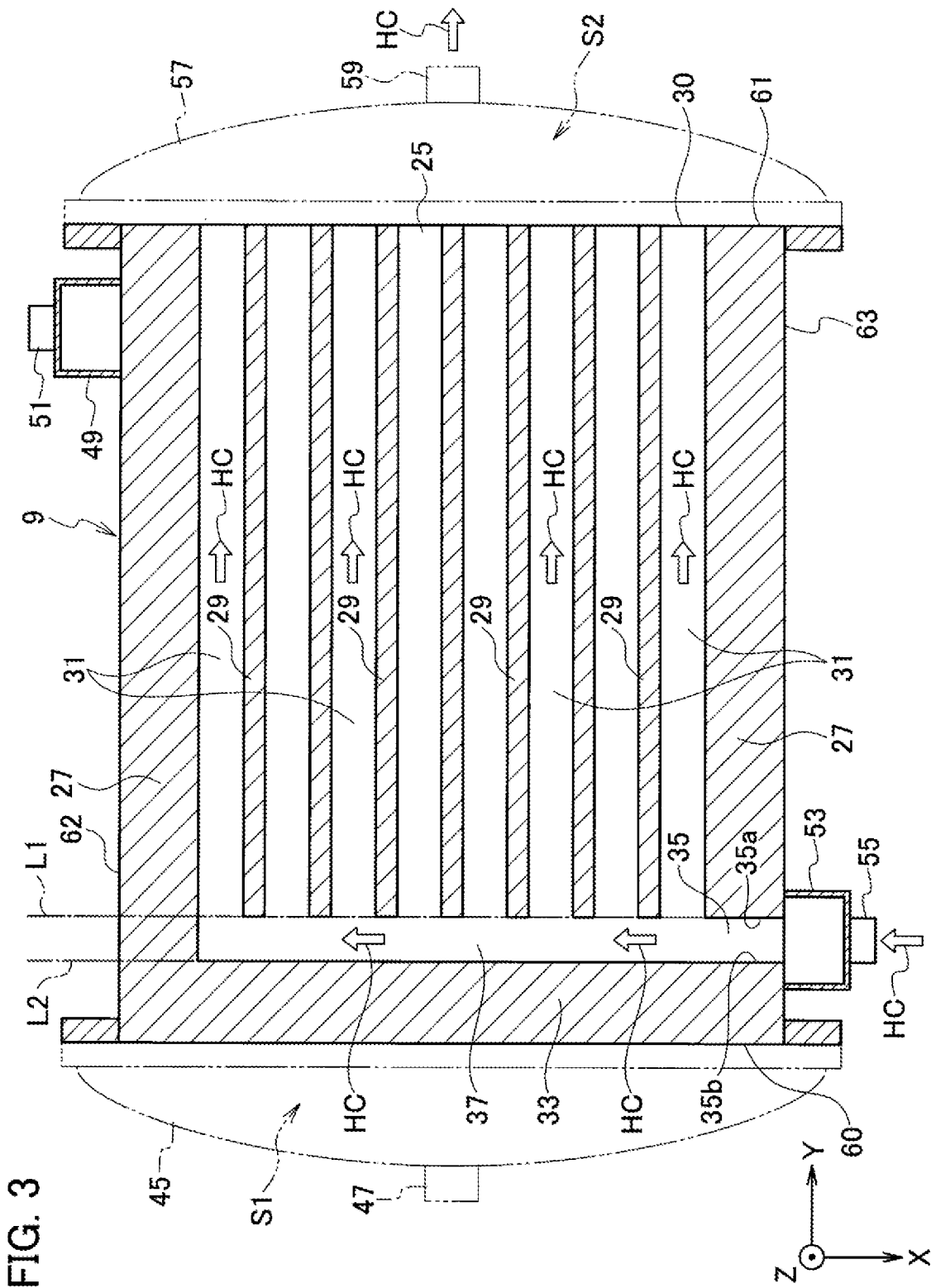
FIG. 3 is a cross-sectional view showing a structure of a second heat transfer body corresponding to a cross-sectional view taken along line in FIG. 1.

FIG. 3 is a cross-sectional view taken along the second heat transfer body 9 in the horizontal direction showing a structure and a shape of a part including the second heat transfer body 9 of the reactor 1. The respective second heat transfer bodies 9 include a plurality of second flow channels 31 as the heat medium flow channels. The respective second flow channels 31 are a groove having a rectangular shape in cross section with the upper side open in the Z direction. According to the present embodiment, the respective second flow channels 31 extend straight in the Y direction, and are arranged at regular intervals in the X direction. One end of the respective second flow channels 31 is open at the second side surface 61 of the heat exchange unit 3 including one side surface of the respective second heat transfer bodies 9 so as to serve as a second drain port 30 from which the high-temperature gas HC is discharged. The other end of the respective second flow channels 31 is located immediately in front of the first side surface 60 of the heat exchange unit 3 including the other side surface of the respective second heat transfer bodies 9, and communicates with a second communication flow channel 37 as described below.

The second heat transfer bodies 9 each include a second base 25, two second side walls 27, a plurality of second interposition walls 29, and a second partition wall 33. The second base 25 is a plate portion covering the entire X-Y plane of the respective second heat transfer bodies 9. The second side walls 27 are wall portions provided at the respective ends on both the right and left sides of the extending direction of the second flow channels 31 on one of the main surfaces of the second base 25. The respective second interposition walls 29 are wall portions interposed between the two second side walls 27 on one of the main surfaces of the second base 25 and arranged at regular intervals parallel to the second side walls 27. The second partition wall 33 extends in the X direction perpendicular to the extending direction of the second flow channels 31 toward the first side surface 60 on one of the main surfaces of the second base 25. According to the present embodiment, the flowing direction of the high-temperature gas HC in the respective second flow channels 31 conforms to the flowing direction of the raw material gas M flowing through the respective first flow channels 17. The first space S1 facing the first side surface 60 is a space to which the raw material gas M is introduced. The second partition wall 33 blocks the plural second flow channels 31 so as not to be brought into contact with the first space S1.

The respective second heat transfer bodies 9 include the second communication flow channel 37 extending along the inner surface of the second partition wall 33. The present embodiment is illustrated with the case in which the single second communication flow channel 37 communicates with all of the second flow channels 31. One end of the second communication flow channel 37 communicates with a second introduction port 35 provided at one of the second side walls 27 so as to introduce the high-temperature gas HC. The second communication flow channel 37, which allows the high-temperature gas HC to flow therethrough, can be a part of the respective second flow channels 31.

The lid body 39 is arranged on the uppermost side of the heat exchange unit 3 in the Z direction. The second heat transfer bodies 9 and the first heat transfer bodies 7 are alternately connected and stacked on one another below the lid body 39, so as to fabricate the heat exchange unit 3 as a connected body or a stacked body. The first flow channels 17 and the second flow channels 31 are adjacent and parallel to each other via the first base 11 or the second base 25. When the heat exchange unit 3 is assembled, the respective members are fixed to each other by a bonding method such as tungsten inert gas (TIG) welding or diffusion bonding, so as to suppress a reduction in heat transfer efficiency derived from poor contact between the respective members.

While the present embodiment is illustrated with the case in which the first heat transfer bodies 7 and the second heat transfer bodies 9 are alternately stacked on one another in the Z direction which is the vertical direction, the present invention is not limited to this case. For example, several sets of the respective heat transfer bodies composing the heat exchange unit 3 transversely connected to each other may be stacked in the Z direction.

The heat transfer material used for the respective elements included in the heat exchange unit 3 is preferably thermally-resistant metal such as an iron alloy or a nickel alloy. More particularly, the thermally-resistant alloy may be an iron alloy such as stainless steel, or a nickel alloy such as Inconel alloy 625 (registered trademark), Inconel alloy 617 (registered trademark), and Haynes alloy 230 (registered trademark). These preferable heat transfer materials have durability or corrosion resistance with respect to a fluid which may be used for promoting the reaction in the first flow channels 17 or used as a heat medium. Alternatively, the heat transfer material may be iron-based plated steel, metal covered with thermally-resistant resin such as fluororesin, or carbon graphite.

The heat exchange unit 3 may be composed of at least a pair of a single first heat transfer body 7 and a single second heat transfer body 9, but the use of a larger number of the respective heat transfer bodies as illustrated in the respective drawings is preferable in order to improve the heat exchange performance. The number of the first flow channels 17 provided in each first heat transfer body 7 and the number of the second flow channels 31 provided in each second heat transfer body 9 may be determined as appropriate and may be changed in view of the designing conditions or the heat transfer efficiency of the heat exchange unit 3. The heat exchange unit 3 may be covered and surrounded by a housing or a heat insulator so as to reduce heat radiation from the heat exchange unit 3 to avoid heat loss.

FIG. 4 is a perspective view showing a catalyst body 41 provided along the inner wall of the respective first flow channels 17. The catalyst body 41 promotes the reaction of the raw material gas M. A catalyst included in the catalyst body 41 is selected as appropriate from substances mainly containing active metal effective in promotion of a chemical reaction, and suitable for the promotion of the reaction based on a synthesis reaction induced in the heat exchange unit 3. Examples of active metals as a catalytic component include nickel (Ni), cobalt (Co), iron (Fe), platinum (Pt), ruthenium (Ru), rhodium (Rh), and palladium (Pd). Several kinds of active metals may be combined together.

The catalyst body 41 is prepared such that the catalyst is supported on a structure material, for example. The structure material is selected from thermally-resistant metals which can be molded and support the catalyst. The catalyst body 41 is a stick-like shape having the entire length L. The catalyst body 41 may have a shape of a corrugated plate pleated in a wave-like form (refer to FIG. 4) or a shape of sharp bellows in cross section so as to increase the contact area with the reaction fluid. Examples of thermally-resistant metals include iron (Fe), chromium (Cr), aluminum (Al), yttrium (Y), cobalt (Co), nickel (Ni), magnesium (Mg), titanium (Ti), molybdenum (Mo), tungsten (W), niobium (Nb), tantalum (Ta), and a thermally-resistant alloy mainly containing one of or some of these metals. The catalyst body 41 may be obtained such that a thin plate structure made of a thermally-resistant alloy such as Fecralloy (registered trademark) is molded. The catalyst may be supported directly on the structure material by surface modification or the like, or may be supported indirectly on the structure material via a carrier. Practically, the use of the carrier facilitates the process of supporting the catalyst. The carrier is selected as appropriate from materials having durability without impeding the promotion of the reaction and capable of supporting the catalyst effectively, in view of the reaction induced in the heat exchange unit 3. The carrier may be a metal oxide such as alumina ($Al_2O_3$), titania ($TiO_2$), zirconia ($ZrO_2$), ceria ($CeO_2$), or silica ($SiO_2$). These metal oxides may be used singly, or some of these metal oxides may be selected and combined together. Examples of supporting methods using the carrier include a process of forming a mixed layer of the catalyst and the carrier on the surface of the structure material molded, and a process of forming a carrier layer and then supporting the catalyst on the carrier layer by surface modification or the like.

Although not illustrated, the respective second flow channels 31 may be provided with a heat transfer promoting body for increasing the contact area with the heat medium so as to promote the heat transfer between the heat medium and the respective second heat transfer bodies 9. The heat transfer promoting body may have a corrugated plate-like shape so as to ensure a sufficient contact area with the respective second heat transfer bodies 9. A heat transfer material used for the heat transfer promoting body may be metal such as aluminum, copper, stainless steel, and iron-based plated copper.

The reaction fluid introduction part 45 is a concave casing, and covers the side surface of the heat exchange unit 3 on which the first introduction ports 20 of the first flow channels 17 are open so as to define the first space S1 together with the heat exchange unit 3. The reaction fluid introduction part 45 is detachable or openable with respect to the heat exchange unit 3. The detachable or openable reaction fluid introduction part 45 allows the operator to insert or remove the catalyst body 41 into or from the respective first flow channels 17, for example. The reaction fluid introduction part 45 includes a first introduction pipe 47 from which the raw material gas M is introduced. The first introduction pipe 47 is located at a position corresponding to the middle of the first side surface 60 of the heat exchange unit 3, in particular, located in the middle on the X-Z plane, and is connected to the reaction fluid introduction part 45 in the same direction as the open direction of the respective first introduction ports 20. This structure can distribute the raw material gas M introduced from one portion to the respective first introduction ports 20.

The product drain part 49 is a box-shaped casing with one surface open, and is arranged on a third side surface 62 of the heat exchange unit 3 such that the open surface faces the respective first drain ports 21 of the first heat transfer bodies 7. The third side surface 62 is one of the side surfaces of the Y-Z planes perpendicular to the first side surface 60 and the second side surface 61. The product drain part 49 includes a first drain pipe 51 at a part of the wall portion thereof for discharging the product gas P containing a product to the outside of the heat exchange unit 3. The first drain pipe 51 is connected to another treatment device (not illustrated) for executing aftertreatment of the product gas P. This structure allows the product gas P discharged from the respective first drain ports 21 to be recovered through the single first drain pipe 51.

The heat medium introduction part 53 is a box-shaped casing with one surface open, and is arranged on a fourth side surface 63 of the heat exchange unit 3 such that the open surface faces the respective second introduction ports 35 of the second heat transfer bodies 9. The fourth side surface 63 is the other side surface opposed to the third side surface 62 in the X direction. The heat medium introduction part 53 includes a second introduction pipe 55 from which the high-temperature gas HC is introduced. This structure can distribute the high-temperature gas HC introduced from one portion to the respective second introduction ports 35.

The heat medium drain part 57 is a concave casing, and covers the side surface of the heat exchange unit 3 on which the second drain ports 30 of the second flow channels 31 are open so as to define the second space S2 together with the heat exchange unit 3. The heat medium drain part 57 is detachable or openable with respect to the heat exchange unit 3. The detachable or openable heat medium drain part 57 allows the operator to insert or remove the heat transfer promoting body into or from the respective second flow channels 31, for example. The heat medium drain part 57 includes a second drain pipe 59 at a part of the wall portion thereof for discharging the high-temperature gas HC to the outside of the heat exchange unit 3. The second drain pipe 59 is located at a position corresponding to the middle of the second side surface 61 of the heat exchange unit 3, in particular, located in the middle on the X-Z plane, and is connected to the heat medium drain part 57 in the same direction as the open direction of the respective second drain ports 30. This structure allows the high-temperature gas HC discharged from the respective second drain ports 30 to be recovered through the single second drain pipe 59.

The heat exchange body 3 may be any of a liquid-liquid heat exchanger, a gas-gas heat exchanger, and a gas-liquid heat exchanger, and the reaction fluid and the heat medium supplied to the heat exchange unit 3 may be either gas or liquid. The heat exchange unit 3 can cause chemical synthesis through at least an exothermic reaction. Examples of exothermic reactions causing synthesis include a shift reaction as represented by the following equation (1), a methanation reaction as represented by the following equation (2), and a Fischer Tropsch synthesis reaction as represented by the following equation (3). The reaction fluid used in these reactions is in a gas state.

$$CO+H_2O \rightarrow CO_2+H_2 \qquad (1)$$

$$CO+3H_2 \rightarrow CH_4+H_2O \qquad (2)$$

$$(2n+1)H_2+nCO \rightarrow C_nH_{2n+2}+nH_2O \qquad (3)$$

The heat medium is preferably a substance not corroding the constituent materials of the heat exchange unit 3, and may be a gaseous substance such as flammable gas or heating air when the heat medium is the high-temperature gas as used in the present embodiment. The heat medium may also be a liquid substance such as water or oil. The gaseous substance used as the heat medium is easier to handle than the liquid medium.

Figure 5:
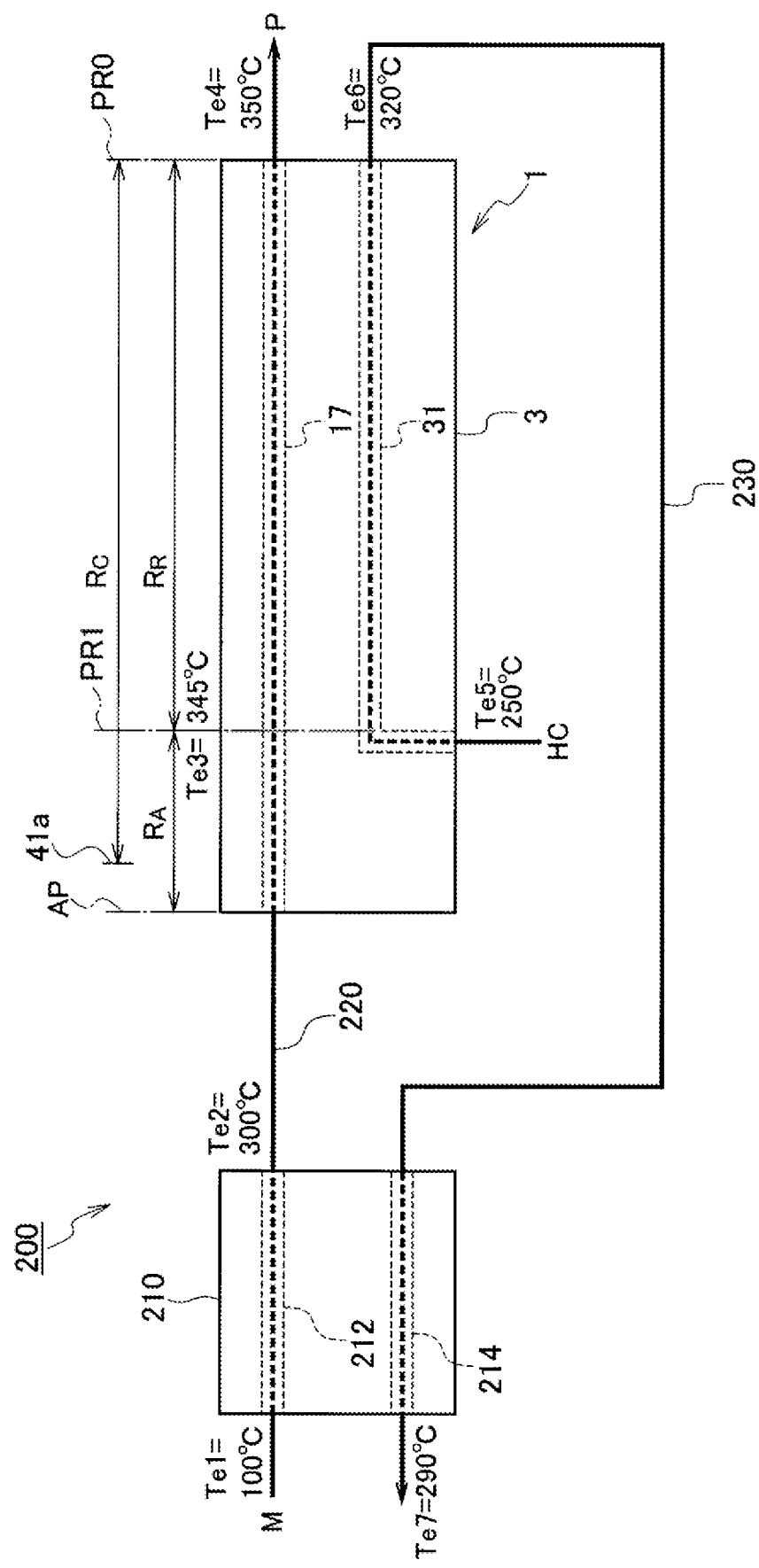
FIG. 5 is a schematic diagram showing a heat exchange system including the reactor according to the first embodiment of the present disclosure.

FIG. 5 is a schematic diagram showing a heat exchange system 200 including the reactor 1 according to the present embodiment. FIG. 5 focuses on a flowing route of the reaction fluid and the heat medium, and a temperature of the respective fluids at each point in the flowing route. The illustration of the constituent elements in the reactor 1 is thus simplified for brevity.

The reactor 1 includes the reaction regions $R_R$ inside the heat exchange unit 3. The reaction regions $R_R$ are each a region in which the raw material gas M is reacted, as described above, and a region in the respective first flow channels 17 particularly corresponding to a part parallel to the second flow channels 31. The reaction regions $R_R$ are each located in the respective first flow channels 17 excluding a preliminary region $R_A$ defined from an inlet position AP of the first flow channels 17 not parallel to the second flow channels 31. A first reference position as an inlet position of the respective reaction regions $R_R$ next to the preliminary region $R_A$ is indicated by PR1, and an outlet position of the respective reaction regions $R_R$ is indicated by PR0. The catalyst body 41 is provided inside the respective first flow channels 17, as described above. The region in which the catalyst body 41 is provided is referred to as a catalyst region $R_C$. The range of the catalyst region $R_C$ is described in detail below.

The heat exchange system 200 includes a heat exchanger 210, for example, in addition to the reactor 1. The heat exchanger 210 executes heat exchange between the raw material gas M before being introduced to the reactor 1 and the high-temperature gas HC after being discharged from the reactor 1. The heat exchanger 210 includes first flow channels 212 through which the raw material gas M flows, and second flow channels 214 through which the high-temperature gas HC flows. An open end on the outlet side of the respective first flow channels 212 is connected to the first introduction pipe 47 of the reactor 1 via a first piping system 220. An open end on the inlet side of the respective second flow channels 214 is connected to the second drain pipe 59 of the reactor 1 via a second piping system 230. A means of the heat exchange of the heat exchanger 210 may be determined as appropriate.

Regarding the reaction fluid, a first gas supply unit (not illustrated) for supplying the raw material gas M to the reactor 1 introduces the raw material gas M to the first flow channels 212 of the heat exchanger 210. A temperature of the raw material gas M immediately before being introduced to the first flow channels 212 is indicated by Te1, and a temperature of the raw material gas M immediately after being discharged from the first flow channels 212 is indicated by Te2. The raw material gas M passing through the heat exchanger 210 is introduced to the first flow channels 17 of the reactor 1 via the first piping system 220, so as to produce the product gas P inside the reaction regions $R_R$. A temperature of the raw material gas M immediately before being introduced to the reaction regions $R_R$ is indicated by Te3, and a temperature of the product gas P immediately after being discharged from the first flow channels 17 is indicated by Te4.

Regarding the heat medium, a second gas supply unit (not illustrated) for supplying the high-temperature gas HC to the reactor 1 introduces the high-temperature gas HC to the second flow channels 31 of the reactor 1 via the second introduction pipe 55 of the reactor 1. The high-temperature gas HC introduced to the second flow channels 31 absorbs the heat from the raw material gas M in the reaction regions $R_R$, and is discharged to the outside through the second drain pipe 59 of the reactor 1. A temperature of the high-temperature gas HC immediately before being introduced to the second flow channels 31 is indicated by Te5, and a temperature of the high-temperature gas HC immediately after being discharged from the second flow channels 31 is indicated by Te6. The high-temperature gas HC discharged from the reactor 1 is introduced to the second flow channels 214 of the heat exchanger 210 through the second piping system 230, and is discharged after the heat exchange. A temperature of the high-temperature gas HC immediately after being discharged from the second flow channels 214 after the heat exchange is indicated by Te1. Although not illustrated, a piping system through which the high-temperature gas HC discharged from the second flow channels 214 flows may be connected to the second gas supply unit so that the high-temperature gas HC circulates inside the heat exchange system 200.

The dimensions of the reaction regions $R_R$ defined in the respective first flow channels 17 are as follows. For example, the flow-channel cross section of the respective reaction regions $R_R$ corresponds to the flow-channel cross section of the respective first flow channels 17, in which the length in the height direction corresponding to the Z direction is 5 millimeters, and the length in the width direction corresponding to the X direction is 12 millimeters. The flow-channel cross section of the respective second flow channels 31 arranged parallel to the respective first flow channels 17 with no contact is the same as the flow-channel cross section of the respective first flow channels 17. The length of the respective reaction regions $R_R$ in the direction corresponding to the Y direction is 1000 millimeters.

The respective temperatures Te1 to Te1 mentioned above are illustrated below. The constituent conditions set for the reactor 1 are as follows. As a first condition, the respective dimensions of the reaction regions $R_R$ as described above are used. As a second condition, the catalyst body 41 is provided in the same region as the respective reaction regions $R_R$, as a comparative example different from the case illustrated in FIG. 5, namely, in which the reaction regions $R_R$ and the catalyst regions $R_C$ conform to each other. As a third condition, the chemical synthesis through the exothermic reaction is executed in the reaction regions $R_R$ as represented by the respective equations described above.

To efficiently induce the reaction in the reaction regions $R_R$, the temperature Te3 of the raw material gas M immediately before being introduced to the reaction regions $R_R$ is preferably increased to 345° C., and the temperature Te4 of the product gas P immediately after being discharged from the first flow channels 17 is preferably increased to 350° C. As compared with these temperatures Te3 and Te4 considered as a reference, regarding the reaction fluid, the temperature Te1 of the raw material gas M is 100° C., and the temperature Te2 is 300° C. Namely, since the maximum temperature of the raw material gas M to be increased is up to 300° C. in the heat exchanger 210, the raw material gas M cannot be preliminarily heated to the temperature Te3 necessary at the first reference position PR1 of the reaction regions $R_R$ located on the downstream side. The first piping system 220 thus conventionally needs to be provided with a preheating device for increasing the temperature of the raw material M from 300° C. to 345° C.

The temperature Te5 for the heat medium is 250° C. The high-temperature gas HC flowing through the second flow channels 31 then absorbs the heat from the raw material gas M flowing through the first flow channels 17, so that the temperature gradually increases. The temperature Te6 is finally led to 320° C. The high-temperature gas HC increased to 320° C. is introduced to the second flow channels 214 of the heat exchanger 210 through the second piping system 230 so as to be reused for heating the raw material gas M. The temperature Te1 is finally led to 290° C.

According to the present embodiment, no preheating device is needed for increasing the temperature of the raw material gas M from Te2 to Te3. The present embodiment expands the catalyst region $R_C$ toward the preliminary region $R_A$, as illustrated in FIG. 5, instead of the use of a preheating device.

Figure 6:
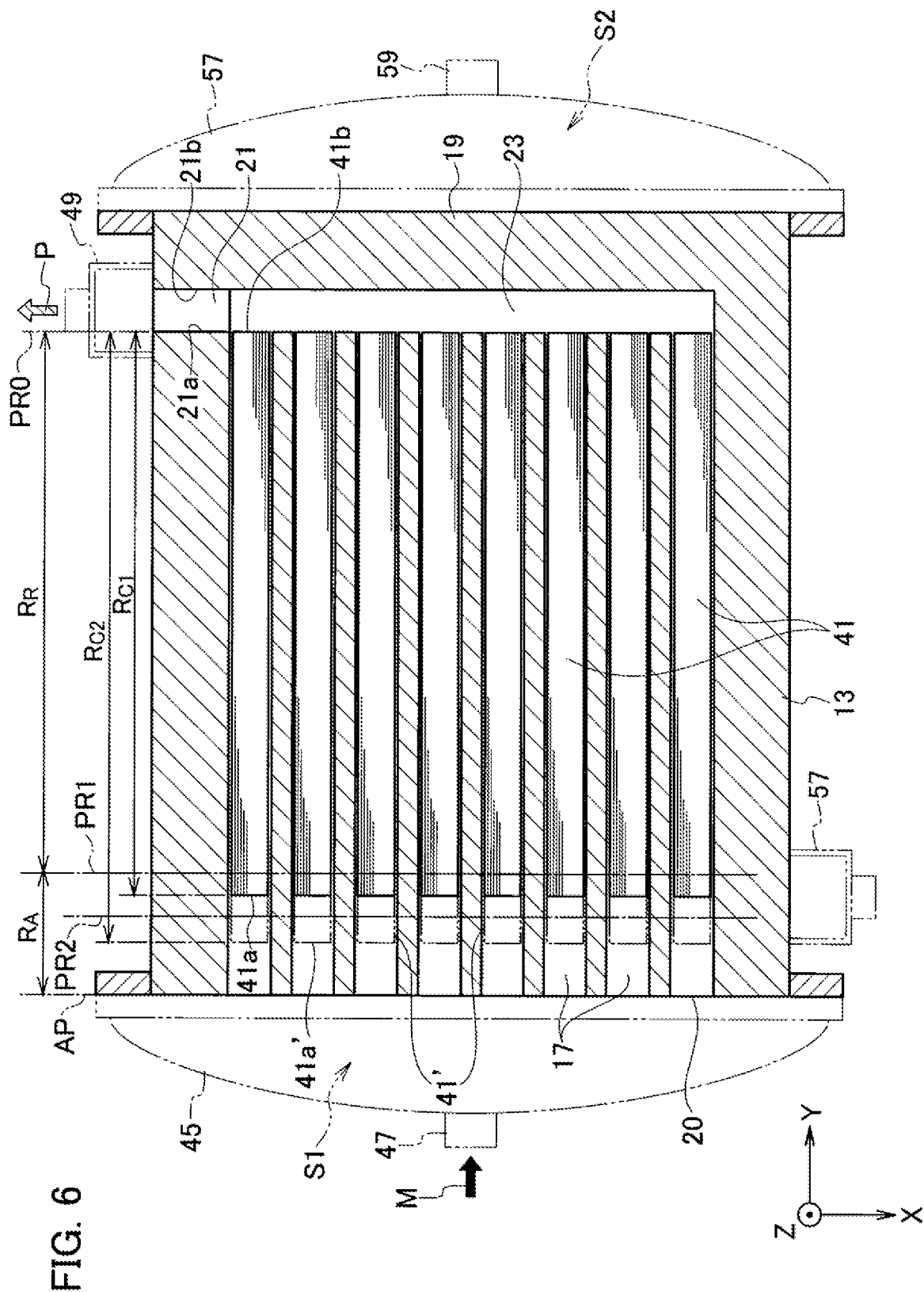
FIG. 6 is a cross-sectional view, corresponding to FIG. 2, showing the first heat transfer body in which the catalyst body is installed.

FIG. 6 is a cross-sectional view showing a state in which the catalyst body 41 is provided in the respective first flow channels 17. The reaction region $R_R$ is defined between the first reference position PR1 and the outlet position PR0.

The first reference position PR1 is defined on the basis of a straight line L1 shown in FIG. 3. The straight line L1, when defined on the basis of the second introduction port 35 of the heat medium, is in contact with a first open end 35a of the second introduction port 35 located on the side bent toward the second flow channel 31, and extends in a direction intersecting with the respective second flow channels 31. The straight line L1 in the example shown in FIG. 3 connects the first open end 35a with the start edge of the respective second flow channels 31 in the X direction. The first reference position PR1 is a position defined such that the straight line L1 as described above is projected on each first heat transfer body 7 in a state in which the first heat transfer bodies 7 and the second heat transfer bodies 9 are alternately stacked on one another, as illustrated in FIG. 6.

The outlet position PR0, when defined on the basis of the first drain port 21 of the product gas P, is in contact with a first open end 21a of the first drain port 21 located on the side on which the respective first flow channels 17 are bent, and extends in a direction intersecting with the respective first flow channels 17. FIG. 6 illustrates a case in which the outlet position PR0 is a straight line connecting the first open end 21a with the end edge of the respective first flow channels 17 in the X direction.

The preliminary region $R_A$ is a region in the respective first flow channels 17 defined between the first reference position PR1 and the inlet position AP, as described above with reference to FIG. 5. The preliminary region $R_A$ is thus not parallel to the respective second flow channels 31 in the state in which the first heat transfer bodies 7 and the second heat transfer bodies 9 are alternately stacked on one another.

The catalyst region $R_C$ is a region in which the catalyst body 41 is provided. As a reference of installation of the catalyst body 41, an end portion 41b of the catalyst body 41 on the downstream side conforms to the outlet position PR0. In the present embodiment, another end portion 41a of the catalyst body 41 on the upstream side is presumed to be located across the first reference position PR1 toward the upstream side. Namely, the length of the catalyst region $R_{C1}$ illustrated in FIG. 6 in the extending direction is greater than the length of the reaction region $R_R$ in the extending direction toward the upstream side. The entire length L of the catalyst body 41 is thus preliminarily set to be greater than the reaction region $R_R$ in the extending direction.

The operation according to the present embodiment is described below.

The constituent conditions set for the reactor 1 are the first to third conditions as described above. In addition, according to the present embodiment, the length of the catalyst region $R_{C1}$ in the extending direction, which is the entire length L of the catalyst body 41, is set to be greater than the length of the reaction region $R_R$ in the extending direction toward the upstream side by 16 millimeters, for example.

In this case, the raw material gas M at the temperature Te2 of 300° C. discharged from the heat exchanger 210 is directly introduced into the respective first flow channels 17 of the reactor 1, as illustrated in FIG. 5, since the present embodiment does not use a preheating device in the first piping system 220. As described above, the reaction is preferably started in the state in which the temperature Te3 reaches 345° C. in the reaction region $R_R$. The conventional reactor, if not using a preheating device, has a problem of the reaction which is started at the temperature Te3 of 300° C., since the catalyst body 41 is only provided in the reaction region $R_R$.

In contrast, the catalyst body 41 is also provided in the preliminary region $R_A$ in the present embodiment. The reaction in the present embodiment is presumed to be an exothermic reaction. The raw material gas M introduced to the preliminary region $R_A$ causes heat of reaction by the exothermic reaction due to the operation of the catalyst body 41 in the preliminary region $R_A$, so as to increase the temperature of the raw material gas M before being introduced to the reaction region $R_R$. The raw material gas M thus can be preliminarily heated so that the temperature Te3 reaches a required temperature without the use of a preheating device in the state in which the dimensions of the catalyst body 41 to be provided in the preliminary region $R_A$ is preliminarily determined in accordance with the dimensions of the respective parts of the first flow channels 17 and the like and the type of the reaction, for example. Under the conditions described above, for example, the temperature Te3 can be increased to 345° C. when the entire length L of the catalyst body 41 is longer by 16 millimeters from the first reference position PR1 toward the upstream side.

The entire length L of the catalyst body 41 to be provided across the first reference position PR1 toward the upstream side may be set to any length that enables the temperature Te3 to reach a required temperature. For example, while the present embodiment is illustrated above with the case of using the first reference position PR1 as a reference for defining the catalyst region $R_{C1}$, a second reference position PR2 may be used as another reference position, as illustrated below with reference to FIG. 6.

The second reference position PR2 is defined on the basis of a straight line L2 shown in FIG. 3. The straight line L2, when defined on the basis of the second introduction port 35 of the heat medium, is in contact with a second open end 35b of the second introduction port 35 on the opposite side of the first open end 35a, and extends in the direction intersecting with the respective second flow channels 31. The straight line L2 in the example shown in FIG. 3 extends along the second partition wall 33 from the second open end 35b continued to the second partition wall 33. The second reference position PR2 is a position defined such that the straight line L2 as described above is projected on each first heat transfer body 7 in the state in which the first heat transfer bodies 7 and the second heat transfer bodies 9 are alternately stacked on one another, as illustrated in FIG. 6. An end portion 41a' of the catalyst body 41' on the upstream side in this case is located in a region across the second reference position PR2 toward the upstream side and defined between the second reference position PR2 and the inlet position AP. The length of the catalyst region $R_{C2}$ in the extending direction in this case is also greater than the length of the reaction region $R_R$ in the extending direction toward the upstream side.

The above embodiment is, for example, illustrated with the respective second heat transfer bodies 9 in which the single second communication flow channel 37 extending from the second introduction port 35 in the direction intersecting with the second flow channels 31 communicates with all of the second flow channels 31. The present disclosure is not limited to the configuration of the first heat transfer bodies 7 or the second heat transfer bodies 9 as illustrated above. The present disclosure may also be applicable to a case of including a plurality of second communication flow channels 37 connected to the second introduction port 35 to individually communicate with the respective second flow channels 31, for example.

Figure 7:
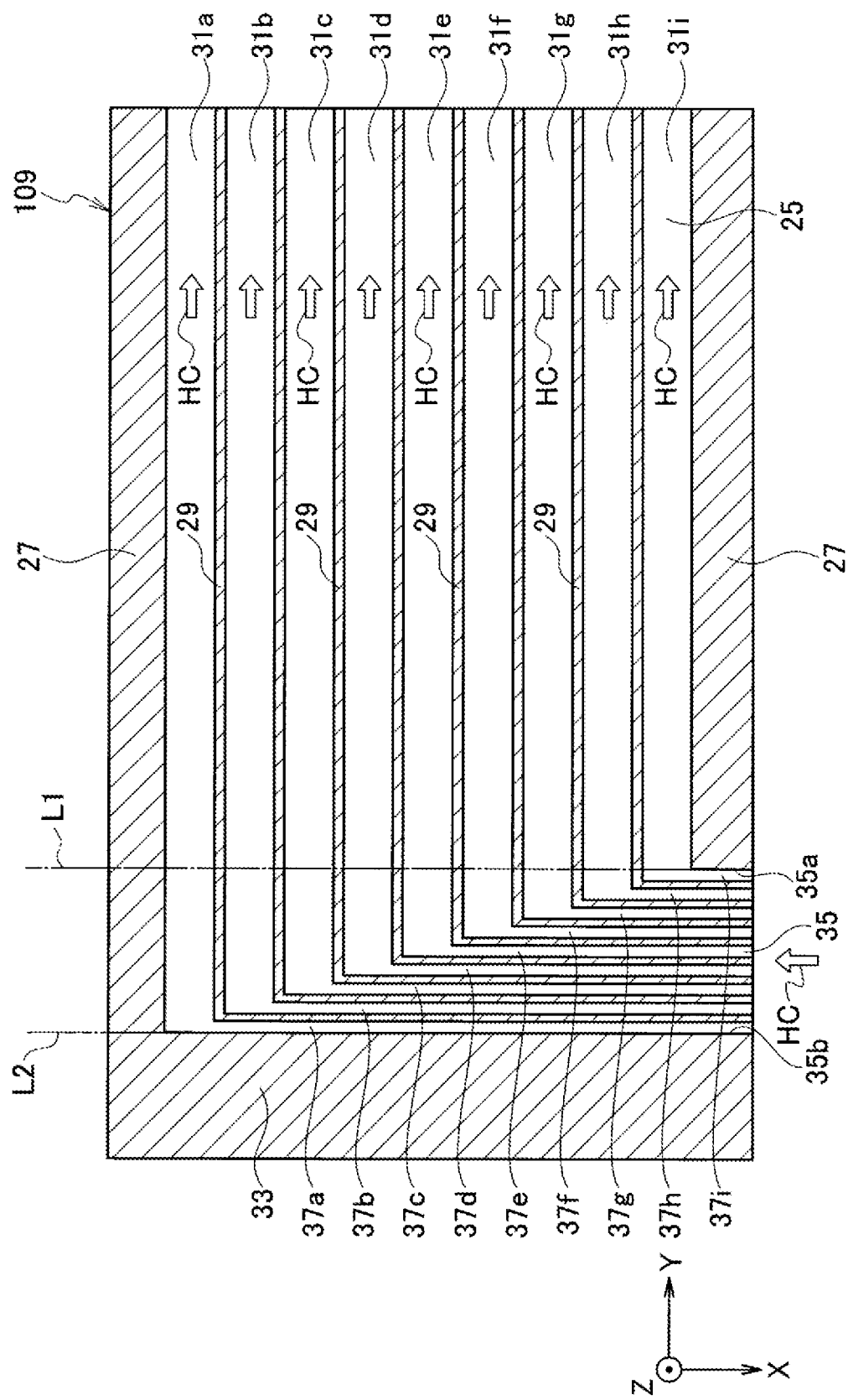
FIG. 7 is a cross-sectional plan view showing another structure of the second heat transfer body.

FIG. 7 is a cross-sectional plan view showing a configuration of a second heat transfer body 109 which is different from the configuration of the respective second heat transfer bodies 9 illustrated above. The second heat transfer body 109 has the same configuration as the respective second heat transfer bodies 9 illustrated above in including the plural second flow channels 31a to 31i. The second heat transfer body 109 differs in a configuration in which the plural second communication flow channels 37a to 37i individually communicating with the corresponding second flow channels 31a to 31i are collectively located at the second introduction port 35 from which the high-temperature gas HC is introduced.

Figure 8:
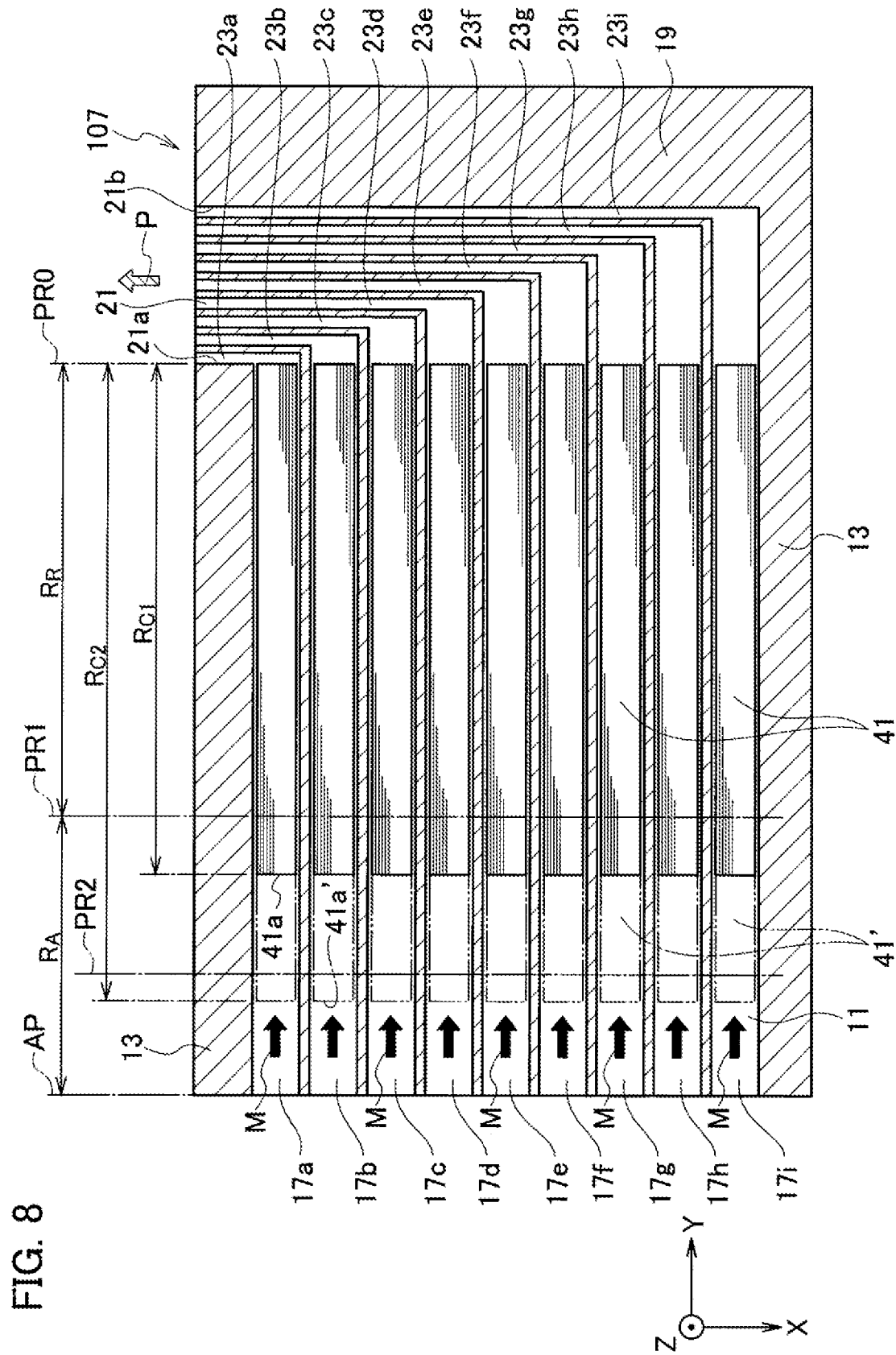
FIG. 8 is a cross-sectional plan view showing another structure of the first heat transfer body.

FIG. 8 is a cross-sectional plan view showing a configuration of another first heat transfer body 107 which is different from the configuration of the respective first heat transfer bodies 7 illustrated above, and showing the catalyst body 41 provided in each of the first flow channels 17a to 17i in this case. The first heat transfer body 107 has the same configuration as the respective first heat transfer bodies 7 illustrated above in including the plural first flow channels 17a to 17i. The first heat transfer body 107 differs in a configuration in which the plural first communication flow channels 23a to 23i individually communicating with the corresponding first flow channels 17a to 17i are collectively located at the first drain port 21 from which the product gas P is discharged.

The first reference position PR1 and the second reference position PR2 are defined as follows when the respective first heat transfer bodies 107 and the respective second heat transfer bodies 109 have the configurations as illustrated in FIG. 7 or FIG. 8.

The first reference position PR1 is defined on the basis of a straight line L1 shown in FIG. 7. This straight line L1 is also in contact with the first open end 35a of the second introduction port 35 located on the side bent toward the second flow channel 31, and extends in the direction intersecting with the respective second flow channels 31. The straight line L1 in the example shown in FIG. 7 connects in the X direction particularly the first open end 35a with the start edge of the second flow channel 31i communicating with the second communication flow channel 37i. The first reference position PR1 is a position defined such that the straight line L1 as described above is projected on each first heat transfer body 107 in the state in which the first heat transfer bodies 107 and the second heat transfer bodies 109 are alternately stacked on one another, as illustrated in FIG. 8.

The second reference position PR2 is defined on the basis of a straight line L2 shown in FIG. 7. This straight line L2 is also in contact with the second open end 35b of the second introduction port 35 on the opposite side of the first open end 35a, and extends in the direction intersecting with the respective second flow channels 31. The straight line L2 in the example shown in FIG. 7 extends along the second partition wall 33 from the second open end 35b particularly in contact with the second communication flow channel 37a and continued to the second partition wall 33. The second reference position PR2 is a position defined such that the straight line L2 as described above is projected on each first heat transfer body 107 in the state in which the first heat transfer bodies 107 and the second heat transfer bodies 109 are alternately stacked on one another, as illustrated in FIG. 8.

The effects according to the present embodiment are described below.

The reactor 1 according to the present embodiment includes the first flow channels 17 through which the reaction fluid flows, the second flow channels 31 through which the heat medium flows, the second flow channels 31 being stacked parallel to the first flow channels 17, and the second introduction ports 35 to which the heat medium is introduced, the second introduction ports 35 being open in the direction intersecting with the second flow channels 31. The reactor 1 also includes the catalyst body 41 provided in the respective first flow channels 17 to promote the exothermic reaction of the reaction fluid. The present embodiment is presumed to define the first reference position PR1 on the basis of the straight line L1 in contact with the first open end 35a of the second introduction port 35 located on the side bent toward the second flow channel 31 and extending in the direction intersecting with the respective second flow channels 31. The present embodiment is also presumed to define the second reference position PR2 on the basis of the straight line L2 in contact with the second open end 35b of the second introduction port 35 on the opposite side of the first open end 35a and extending in the direction intersecting with the respective second flow channels 31. The catalyst body 41 is provided at least either in the region defined between the first reference position PR1 and the second reference position PR2, or in the region defined between the second reference position PR2 and the inlet position AP of the respective first flow channels 17.

The reactor 1 according to the present embodiment provided with the catalyst 41 not only in the reaction region $R_R$ but also in the respective regions described above can preliminarily heat the reaction fluid immediately before being introduced to the reaction region $R_R$ to a required temperature. The reactor 1 thus does not need to use a preheating device for increasing the temperature of the reaction fluid immediately before being introduced to the reaction region $R_R$ to a required temperature. The elimination of a preheating device thus can achieve a reduction in cost of the entire heat exchange system 200 including the reactor 1.

The present embodiment can increase the temperature of the reaction fluid immediately before being introduced to the reaction region $R_R$ to a required temperature due to the heat of reaction by the exothermic reaction using the catalyst body 41, so as to further eliminate any additional heat source prepared as an alternative to a preheating device.

As shown in FIG. 3, for example, the second heat transfer body 9 has the second partition wall 33 and the second communication channel 37 at the position corresponding to the preliminary region $R_A$ in the first heat transfer body 7 including the respective regions described above. The second partition wall 33 and the second communication channel 37 are the elements necessary for any reactor when fabricated, regardless of the application of the present embodiment. Since the preliminary region $R_A$ is not a region additionally required for the reactor 1 upon the application of the present embodiment, the heat exchange unit 3 does not differ in the structure from any conventional reactor. The present embodiment thus does not require either a great change in the structure of the reactor or an increase in size of the reactor.

Second Embodiment

A reactor according to a second embodiment of the present disclosure is described below. According to the first embodiment described above, the catalyst region $R_C$ in which the catalyst body 41 is provided not only covers the reaction region $R_R$ but further extends to the preliminary region $R_A$. The position corresponding to the preliminary region $R_A$ in the second heat transfer body 9 or the second heat transfer body 109 is the second partition wall 33. The second partition wall 33 illustrated as an example in the first embodiment is a simple wall portion. The second partition wall 33 according to the present embodiment is not a simple wall portion but is provided with third flow channels different from the second flow channels 31.

Figure 9:
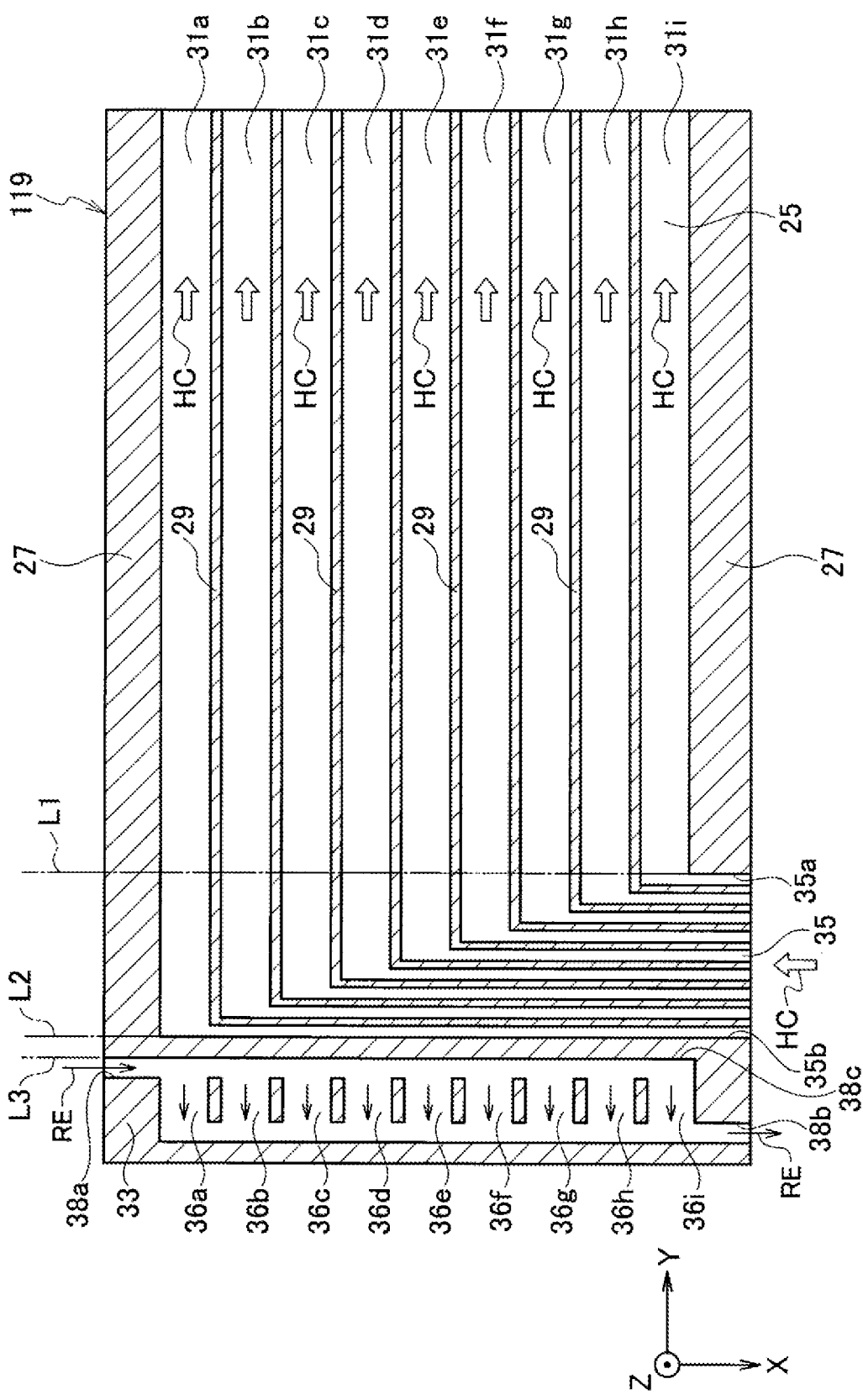
FIG. 9 is a cross-sectional plan view showing a structure of a second heat transfer body according to a second embodiment of the present disclosure.

FIG. 9 is a cross-sectional plan view showing a configuration of a second heat transfer body 119 included in the reactor according to the present embodiment. The second heat transfer body 119 illustrated below as an example has a configuration modified from the second heat transfer body 109 described in the first embodiment. The same elements as those in the second heat transfer body 109 are thus denoted by the same reference numerals, and overlapping explanations are not repeated below.

The second heat transfer body 119 includes the third flow channels 36 which are stacked parallel to the first flow channels 17 of a first heat transfer body 117 according to the present embodiment described below, and are located on the introduction side of the heat medium and opposed in line to the corresponding second flow channels 31 with no contact. A fluid flowing through the respective third flow channels 36 is a refrigerant RE, for example. The present embodiment is illustrated with a case as an example in which the second heat transfer body 119 is provided with the nine second flow channels 31a to 31i. The second heat transfer body 119 is thus provided with the nine third flow channels 36a to 36i corresponding to the respective second flow channels 31a to 31i. The second heat transfer body 119 further includes a third introduction port 38a through which the fluid is externally introduced to the respective third flow channels 36, and a third drain port 38b through which the fluid is discharged to the outside from the respective third flow channels 36. For example, the third introduction port 38a is provided on one of the second side walls 27, and the third drain port 38b is provided on the other second side wall 27.

The arrangement position of the third introduction port 38a or the third drain port 38b is not limited to the case shown in FIG. 9. For example, the third introduction port 38a and the third drain port 38b both may be provided on the same second side wall 27 on one side. When the third introduction port 38a is presumed to be located at the same position as the case shown in FIG. 9, the third drain port 38b may be located at a position on the same second side wall 27 as the third introduction port 38a and on the opposite side of the position shown in FIG. 9. When the third drain port 38b is presumed to be located at the same position as the case shown in FIG. 9, the third introduction port 38a may be located at a position on the same second side wall 27 as the third drain port 38b and on the opposite side of the position shown in FIG. 9. In the example shown in FIG. 9, the third introduction port 38a communicates with the respective third flow channels 36 on the side closer to the second flow channels 31, and the third drain port 38b communicates with the respective third flow channels 36 on the other side distant from the second flow channels 31 in the Y direction which is the extending direction of the respective third flow channels 36. Alternatively, the third introduction port 38a and the third drain port 38b both may communicate with the respective third flow channels 36 on the side closer to the second flow channels 31, or both may communicate with the respective third flow channels 36 on the side distant from the second flow channels 31.

The flowing route and the flowing direction of the refrigerant RE in the respective third flow channels 36 are not limited to the case shown in FIG. 9. For example, the flowing route of the refrigerant RE may be the same as the case shown in FIG. 9, while the flowing direction may be opposite to the direction shown in FIG. 9. When the positions of the third introduction port 38a and the third drain port 38b are different from the case illustrated in FIG. 9, as described above, the flowing route may be set to any conceivable route depending on the corresponding positions of the respective ports.

The third introduction port 38a and the third drain port 38b are connected to a refrigerant circulation device via a refrigerant pipe (not shown). The refrigerant circulation device can circulate the refrigerant RE in the third flow channels 36 at a desirable temperature, flowing amount, and timing.

Figure 10:
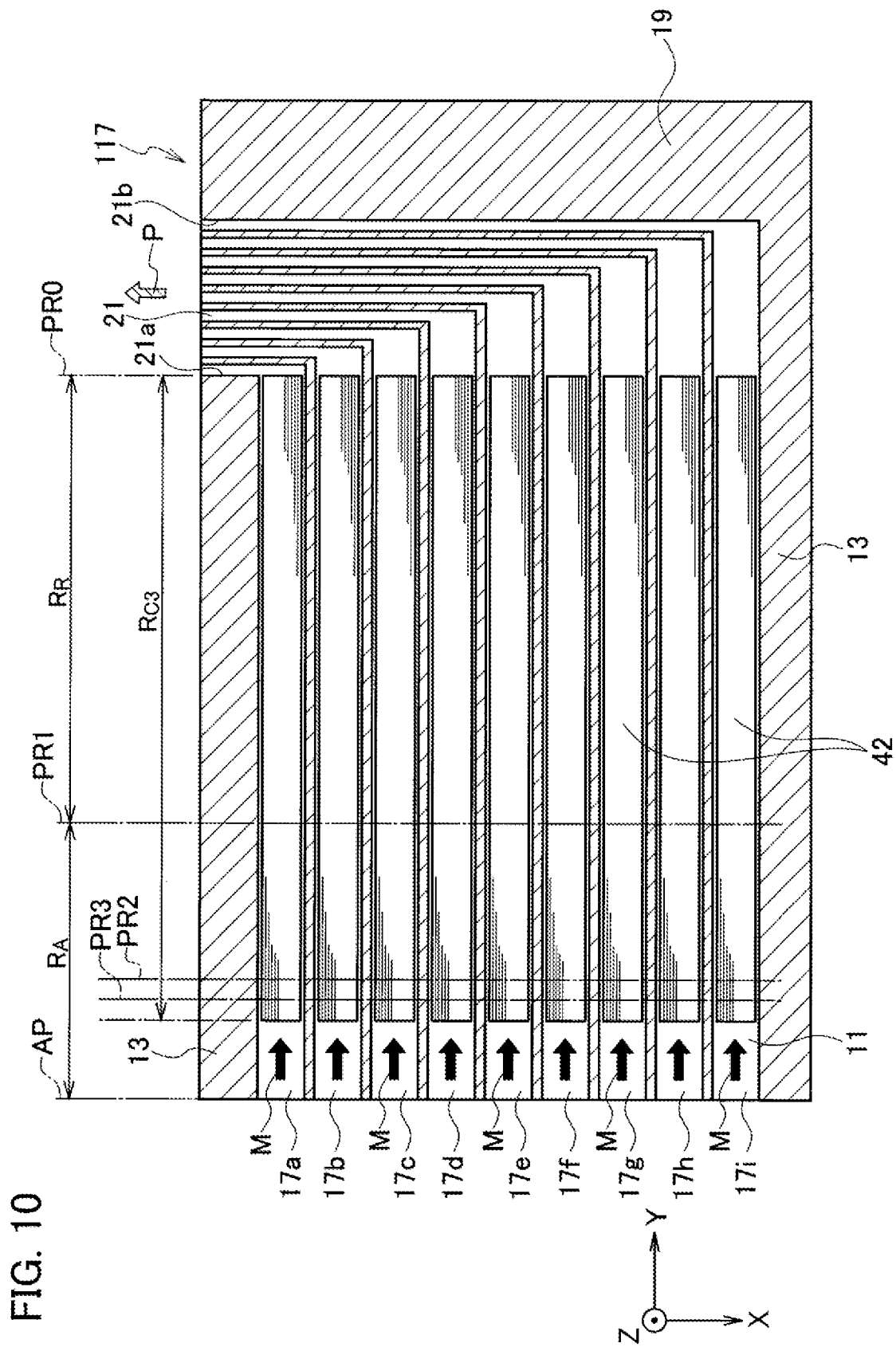
FIG. 10 is a cross-sectional plan view showing a structure of a first heat transfer body according to the second embodiment of the present disclosure.

FIG. 10 is a cross-sectional plan view showing a configuration of the first heat transfer body 117 included in the reactor according to the present embodiment, and a configuration of a catalyst body 42 provided in the respective first flow channels 17. The configuration of the first heat transfer body 117 is the same as that of the first heat transfer body 107 described in the first embodiment. The same elements as those in the first heat transfer body 107 are thus denoted by the same reference numerals, and overlapping explanations are not repeated below.

The present embodiment is illustrated with a third reference position PR3 presumed to be defined on the basis of a third straight line L3 (refer to FIG. 9) in contact with an end portion 38c of the respective third flow channels 36 opposed to the introduction side of the heat medium of the respective second flow channels 31, and extending in a direction intersecting with the respective third flow channels 36. A catalyst region $R_{C3}$ in which the catalyst body 42 is provided not only covers the reaction region $R_R$ but can further extend to the preliminary region $R_A$. The catalyst body 42 illustrated as an example in the present embodiment is provided in a region defined between the third reference position PR3 and the inlet position AP of the respective first flow channels 17.

The configuration in which the catalyst body 42 is provided to extend to the preliminary region $R_A$ is presumed to promote the exothermic reaction more than expected, and lead the temperature Te3 of the raw material gas M to increase excessively, for example. Causing the refrigerant RE to flow into the respective third flow channels 36 can avoid such an excessive increase in temperature more than presumed.

Third Embodiment

The catalyst body 41 or the catalyst body 42 provided in each first flow channel 17 illustrated in the respective embodiments above is a single body, as shown in FIG. 4. The present disclosure is not limited to the single catalyst body 41 or the single catalyst body 42 provided in each first flow channel 17, and a plurality of short catalyst bodies may be connected together so as to have the entire length L.

Figure 11:
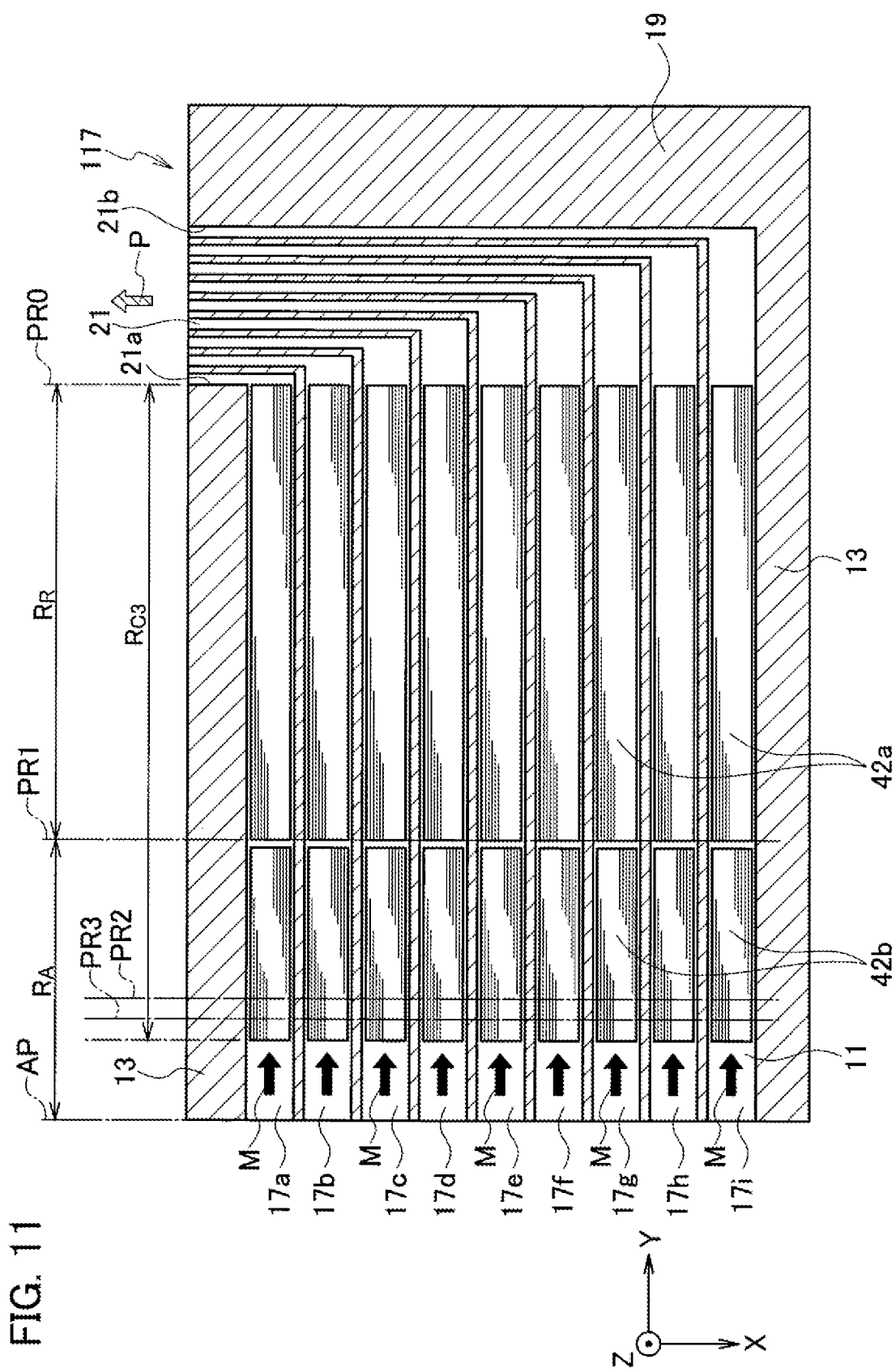
FIG. 11 is a cross-sectional plan view showing a structure of a catalyst body according to a third embodiment of the present disclosure.

FIG. 11 is a cross-sectional plan view showing a configuration of a first catalyst body 42a and a second catalyst body 42b according to the present embodiment. The following is a comparison, as an example, with the catalyst body 42 provided in the first heat transfer body 117 as illustrated in the second embodiment.

The catalyst body provided in each of the first flow channels 17, which has the same entire length as the catalyst body 42 described in the second embodiment, may be composed of the first catalyst body 42a and the second catalyst body 42b connected in series, for example. The arrangement of the catalyst bodies connected in series saves the process of simultaneously replacing both the first catalyst body 42a and the second catalyst body 42b every time if part of the first catalyst body 42a causes a defect, since only the first catalyst body 42a needs to be replaced, contributing to the effective usage of the catalyst bodies.

As illustrated in FIG. 11, at least one of the plural catalyst bodies, such as the first catalyst body 42a, may be provided toward a region on one side based on the first reference position PR1. At the same time, at least the other one of the plural catalyst bodies, such as the second catalyst body 42b, may be provided toward a region on the other side based on the first reference position PR1. The region on one side of the first reference position as used herein refers to the reaction region $R_R$. The region on the other side of the first reference position as used herein refers to the preliminary region $R_A$. A speed of degradation of the catalyst bodies 42 may differ between the reaction region $R_R$ and the preliminary region $R_A$. Replacing only the catalyst body degraded earlier, for example, replacing only the first catalyst body 42a can save the process of simultaneously replacing both the first catalyst body 42a and the second catalyst body 42b every time when degraded, contributing to the effective usage of the catalyst bodies.

Fourth Embodiment

A reactor according to a fourth embodiment of the present disclosure is described below. The second embodiment is illustrated above with the case in which the second heat transfer body 119 includes the third flow channels 36 through which the refrigerant RE flows. The present embodiment is illustrated below, as a modified example of the third flow channels 36, with a case in which the second heat transfer body 119 includes fourth flow channels through which the flowing refrigerant RE is introduced finally to the respective second flow channels 31.

Figure 12:
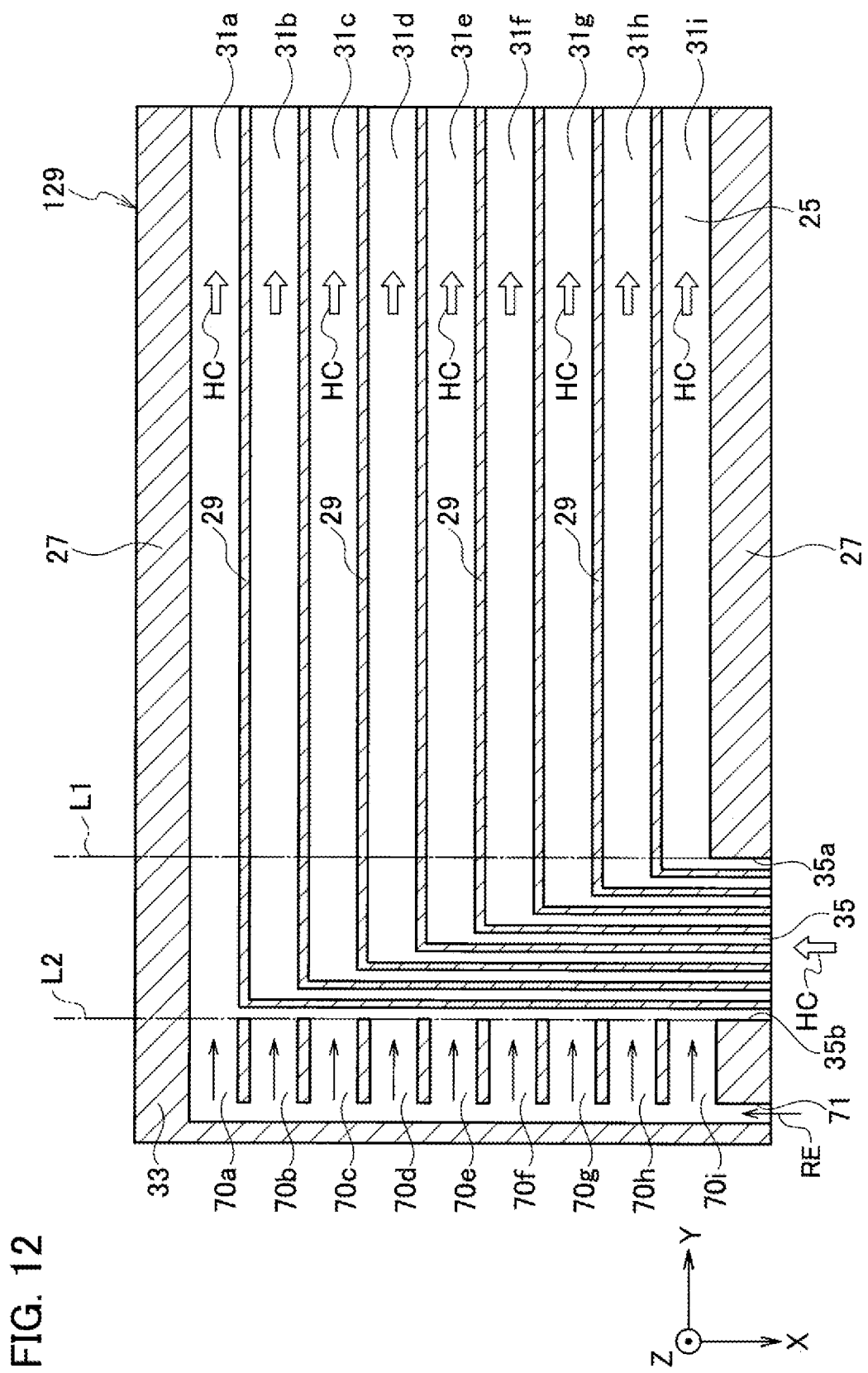
FIG. 12 is a cross-sectional plan view showing a structure of a second heat transfer body according to a fourth embodiment of the present disclosure.

FIG. 12 is a cross-sectional plan view showing a configuration of a second heat transfer body 129 included in the reactor according to the present embodiment. The second heat transfer body 129 illustrated below as an example has a configuration modified from the second heat transfer body 119 described in the second embodiment. The same elements as those in the second heat transfer body 119 are thus denoted by the same reference numerals, and overlapping explanations are not repeated below.

The second heat transfer body 129 includes the fourth flow channels 70 stacked parallel to the first flow channels 17. The second heat transfer body 129 includes a fourth introduction port 71 through which the refrigerant RE is introduced to the respective fourth flow channels 70. One end of the respective fourth flow channels 70 communicates with the fourth introduction port 71. The other end of the respective fourth flow channels 70 communicates in line with the corresponding second flow channels 31 on the introduction side of the heat medium at a position of the straight line L2 defining the second reference position PR2. The second heat transfer body 129 is provided with the nine second flow channels 31a to 31i as an example, as in the case of the second heat transfer body 119 described in the second embodiment. The second heat transfer body 129 is thus provided with the nine fourth flow channels 70a to 70i corresponding to the respective second flow channels 31a to 31i. The refrigerant RE introduced from the second introduction port 35 may be led to flow through the respective fourth flow channels 70a to 70i. The fourth introduction port 71 then serves as a drain port from which the refrigerant RE is discharged.

FIG. 12 is illustrated with the case without a drain port for the fourth flow channels 70 from which the refrigerant RE is discharged to the outside, which differs from the case illustrated in FIG. 9, for example, since the refrigerant RE is finally totally introduced to the respective second flow channels 31. The present embodiment, however, is not limited to this case, and may include a drain port for the fourth flow channels 70 from which the refrigerant RE is discharged to the outside. In particular, the introduction port through which the refrigerant RE is introduced to the respective fourth flow channels 70 is provided on the side closer to the second introduction port 35 from which the heat medium HC is introduced in the Y direction which is the extending direction of the fourth flow channels 70. The drain port through which the refrigerant RE is discharged from the respective fourth flow channels 70 is provided on the side distant from the second introduction port 35. The phrase "distant side" as used herein refers to the side corresponding to the position of the fourth introduction port 71 shown in FIG. 12. This configuration leads the refrigerant RE introduced to the respective fourth flow channels 70 to be branched into the direction to be introduced to the second flow channels 31 and the direction to be discharged to the outside from the drain port additionally provided. The flowing direction of the refrigerant RE in the respective flow channels 70 may be changed to the opposite direction of the direction indicated by the arrows in FIG. 12, depending on the positions of the introduction port and the drain port of the refrigerant RE for the fourth flow channels 70.

The fourth introduction port 71 is connected to a refrigerant supply device via a refrigerant pipe (not shown). The refrigerant supply device can supply the refrigerant RE to the respective fourth flow channels 70 at a desirable temperature, flowing amount, and timing.

If the temperature Te3 of the raw material gas M, for example, increases excessively in the structure according to the present embodiment due to the catalyst body provided to extend to the preliminary region $R_A$, as in the case of the respective embodiments, the flow of the refrigerant RE through the respective fourth flow channels 70 can reduce an unexpected excessive increase in temperature. The present embodiment differs from the second embodiment in that the refrigerant RE passing through the fourth flow channels 70 are to be introduced directly to the second flow channels 31.

It should be understood that the present disclosure includes various embodiments which are not disclosed herein. Therefore, the scope of the present disclosure is defined only by the matters according to the claims reasonably derived from the description above.

REFERENCE SIGNS LIST

1 REACTOR
17 FIRST FLOW CHANNEL
31 SECOND FLOW CHANNEL
35 INTRODUCTION PORT (SECOND INTRODUCTION PORT)
35a FIRST OPEN END
35b SECOND OPEN END
36 THIRD FLOW CHANNEL
38c END PORTION OF THIRD FLOW CHANNEL
41, 42 CATALYST BODY
42a FIRST CATALYST BODY
42b SECOND CATALYST BODY
70 FOURTH FLOW CHANNEL
71 FOURTH INTRODUCTION PORT
AP INLET POSITION OF FIRST FLOW CHANNEL
PR1 FIRST REFERENCE POSITION
PR2 SECOND REFERENCE POSITION
PR3 THIRD REFERENCE POSITION
L1 FIRST STRAIGHT LINE
L2 SECOND STRAIGHT LINE
L3 THIRD STRAIGHT LINE

What is claimed is:
1. A reactor comprising:
a first flow channel through which a reaction fluid flows;
a second flow channel through which a heat medium flows, the second flow channel being stacked parallel to the first flow channel;
an introduction port open in a direction intersecting with the second flow channel to introduce the heat medium;
a catalyst body provided in the first flow channel to promote an exothermic reaction of the reaction fluid; and
a third flow channel through which a refrigerant flows, the third flow channel being stacked parallel to the first flow channel and opposed in line to the second flow channel with no contact on an introduction side of the heat medium of the second flow channel,
wherein, when
a first reference position is presumed to be defined by a straight line in contact with a first open end of the introduction port on a side bent toward the second flow channel and extending in the direction intersecting with the second flow channel,
a second reference position is presumed to be defined by a straight line in contact with a second open end of the introduction port on an opposite side of the first open end and extending in the direction intersecting with the second flow channel, and
a third reference position is presumed to be defined by a straight line in contact with an end portion of the third flow channel opposed to the introduction side of the heat medium of the second flow channel and extending in a direction intersecting with the third flow channel,
at least part of the catalyst body is provided:
at least either in a region defined between the first reference position and the second reference position, or in a region defined between the second reference position and the third reference position; and in a region defined between the third reference position and the inlet position of the first flow channel.

2. A reactor comprising:

a first flow channel through which a reaction fluid flows;

a second flow channel through which a heat medium flows, the second flow channel being stacked parallel to the first flow channel;

an introduction port open in a direction intersecting with the second flow channel to introduce the heat medium;

a catalyst body provided in the first flow channel to promote an exothermic reaction of the reaction fluid; and a fourth flow channel through which a refrigerant flows, wherein, when a first reference position is presumed to be defined by a straight line in contact with a first open end of the introduction port on a side bent toward the second flow channel and extending in the direction intersecting with the second flow channel, and a second reference position is presumed to be defined by a straight line in contact with a second open end of the introduction port on an opposite side of the first open end and extending in the direction intersecting with the second flow channel, at least part of the catalyst body is provided at least either in a region defined between the first reference position and the second reference position, or in a region defined between the second reference position and an inlet position of the first flow channel, and the fourth flow channel is stacked parallel to the first flow channel, has one end communicating with an introduction port from which the refrigerant is introduced, and has another end communicating in line with the second flow channel on an introduction side of the heat medium at a position of the straight line defining the second reference position.

3. A reactor comprising:

a first flow channel through which a reaction fluid flows;

a second flow channel through which a heat medium flows, the second flow channel being stacked parallel to the first flow channel;

an introduction port open in a direction intersecting with the second flow channel to introduce the heat medium; and a catalyst body provided in the first flow channel to promote an exothermic reaction of the reaction fluid, wherein: when a first reference position is presumed to be defined by a straight line in contact with a first open end of the introduction port on a side bent toward the second flow channel and extending in the direction intersecting with the second flow channel, and a second reference position is presumed to be defined by a straight line in contact with a second open end of the introduction port on an opposite side of the first open end and extending in the direction intersecting with the second flow channel, at least part of the catalyst body is provided at least either in a region defined between the first reference position and the second reference position, or in a region defined between the second reference position and an inlet position of the first flow channel;

the catalyst body comprises a plurality of catalyst bodies provided in the first flow channel;

at least one of the catalyst bodies is provided in a region on one side based on the first reference position; and at least another one of the catalyst bodies is provided in a region on another side based on the first reference position.

* * * * *